US007642442B2

(12) United States Patent
Adam et al.

(10) Patent No.: US 7,642,442 B2
(45) Date of Patent: Jan. 5, 2010

(54) METHODS, PROGRAMS, STORAGE MEDIA AND SYSTEMS FOR RECORDING AND COMPILING A MUSIC SECTION

(75) Inventors: Thorsten Adam, Hamburg (DE); Jens Altfelder, Hamburg (DE); Robert Hunt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 11/713,231

(22) Filed: Mar. 1, 2007

(65) Prior Publication Data

US 2008/0212442 A1 Sep. 4, 2008

(51) Int. Cl.
*A63H 5/00* (2006.01)
*G04B 13/00* (2006.01)

(52) U.S. Cl. .............. 84/609; 84/601; 84/603; 84/604; 84/610; 84/634

(58) Field of Classification Search ............ None
See application file for complete search history.

(56) References Cited

U.S. PATENT DOCUMENTS

| 6,222,549 B1 | 4/2001 | Hoddie |
| 6,740,802 B1 * | 5/2004 | Browne, Jr. ............. 84/609 |
| 7,058,882 B2 * | 6/2006 | Kobayashi ............ 715/204 |
| 2004/0103233 A1 | 5/2004 | Shinkai et al. |
| 2004/0159221 A1 * | 8/2004 | Camiel ................. 84/660 |

FOREIGN PATENT DOCUMENTS

| EP | 0282779 A1 | 9/1988 |
| EP | 0438299 A2 | 7/1991 |
| GB | 2294355 A | 4/1996 |

OTHER PUBLICATIONS

PCT International Search Report and Written Opinion for PCT International Appln No. PCT/US2008/002564, mailed on Jul. 15, 2008 (14 pages).
David Pogue, *GarageBand 2 The Missing Manual*, Aug. 2005, O'Reilly Media, Sebastopol, California, USA [cover, title page and Table of Contents (6 pages total)].
Mary Plummer, *GarageBand 3 Create and Record Music on a Mac*, 2006, Peachpit Press, Berkeley, California, USA [cover, title page and Table of Contents (6 pages total)].

* cited by examiner

*Primary Examiner*—Marlon T Fletcher
(74) *Attorney, Agent, or Firm*—Blakely, Sokoloff, Taylor & Zafman LLP

(57) ABSTRACT

This disclosure relates to a method for recording and compiling a music section, wherein multiple takes of the music section are recorded; and wherein the method uses a take folder to store the multiple takes. The take folder may belong to a single track. Sections of one or more takes can be selected to be part of a resulting compilation which is composed of the selected sections. In one embodiment, a method automatically ensures that selected sections do not overlap in time and that there are no breaks between adjacent selections. In addition, the present invention relates to programs, a storage media and data processing systems having the above features as well as to a storage medium containing the music produced thereby.

40 Claims, 3 Drawing Sheets

METHODS, PROGRAMS, STORAGE MEDIA AND SYSTEMS FOR RECORDING AND COMPILING A MUSIC SECTION

The present invention relates to methods, programs, storage media and data processing systems for recording and compiling a media section and more specifically for recording and compiling a media section using cycle recording. The media may be music or other audio data.

BACKGROUND

Recently, music projects that in former times would have required an array of professional studio equipment can now be completed in a home or project studio, using a personal computer and readily available resources. A personal computer with a fast processor and enough RAM can serve as a workstation for recording, arranging, mixing, and producing complete music projects, which can be played back on the computer, burned on a CD or DVD, or distributed over the Internet.

A user of such a program for producing complete music projects can choose among a lot of alternative window arrangements depending on the workflow he wants to conduct. There are, for example, different window arrangements for editing a selected track or for showing the mixer to manipulate different channels.

One feature which is commonly used for music production is cycle recording. Cycle or loop recording means that a specified time interval is successively recorded several times. Each of these recordings is saved in a separate track. Afterwards, it is possible to cut and paste material of those different tracks manually together to one final music section in one track. This process of putting together a final music section in one track out of these cycle recordings is called "compiling".

SUMMARY OF THE DESCRIPTION

At least certain embodiments of the present invention include a method for recording and compiling a music section, wherein multiple takes of the music section are recorded; and wherein the method uses a take folder to store the multiple takes. The take folder may be a data structure used in a computer's operating system to represent a subdirectory or logical folder or it may be a data structure of an application program or a file system of a data processing system. When recording the same portion of an audio part multiple times, each of those recordings is called "take". The take folder is associated with a single track. For example, the take folder may belong to the single track. The take folder of at least certain embodiments of the present invention allows for multiple takes of, for example, a cycle recording to all be associated with a single track. Thus, it is no longer necessary to compile an audio section manually out of multiple tracks when working with several takes of a cycle recording. Advantages of using a take folder will be explained in more detail with reference to the figures.

Preferably, different takes are displayed separately on the same display when the take folder is opened. To give a better impression of the recorded data, it is possible to display waveform data for each take.

In at least certain embodiments, sections of one or more takes can be selected to be part of a resulting compilation which is composed of the selected sections. Preferably, selected sections are highlighted in the different takes when the take folder is opened, e.g. by a black background and/or in that not used selections are dimmed in color or other appearance.

It is advantageous, in at least certain embodiments, that a first area of the take folder displays the selected compilation. Transitions from one take to another can be marked within the first display area of the take folder. Thereby, the user can easily recognize those transitions. Furthermore, the user can change the selection in different sections by choosing a section and selecting a different take for that section.

At least certain embodiments of the invention automatically ensure that selected sections do not overlap in time. Overlaps in time would either lead to a corruption of the compilation or two signals would be reproduced at the same time which will cause undesired sound effects. Therefore, the present invention in at least certain embodiments includes a feature which provides that selecting a section in one take deselects the same section in all other takes.

The present invention in a further embodiment automatically ensures that there are no breaks in the compilation by extending one or more adjacent selections in one or more other takes when a selection is deselected or reduced in one take. This prevents undesired gaps or time periods without any sound.

The present invention in a further embodiment provides a program for recording and compiling a music section, which instructs a data processing system, such as a computer system, to execute a method for recording and compiling a music section as described herein.

The present invention may also provide a storage medium, which stores a program for recording and compiling a music section as described herein.

Additionally, the present invention may provide a data processing system, such as a computer system, being adapted to execute a program for recording and compiling a music section as described herein, preferably a computer system having the program loaded.

In a yet further embodiment there is provided a data storage device, such as a magnetic drive or a CD, a DVD or other optical storage media or a solid state memory (e.g. flash memory) on which a music section compiled in accordance with one of the processes of this invention has been stored.

BRIEF DESCRIPTION OF THE DRAWINGS

The following description illustrates together with the appended claims features, examples and embodiments of the invention as well as advantages and aspects of the invention in conjunction with the drawings, in which the exemplary diagram of:

DETAILED DESCRIPTION

When recording the same portion of an audio part (e.g. a guitar solo) multiple times, each of those recordings is called "take". This same portion is typically specified by a portion of a musical score, and is typically one or more bars of the musical score, such as a score written in 4/4 time. The actual sound in each take may be slightly different, but the performance of the take is of the same portion. Takes are usually created by recording in cycle mode (also called loop mode), but can also be created by recording over existing regions of an audio track.

At least certain embodiments of the present invention provide a take folder in which a plurality of takes is stored. The takes are preferably not stored in different tracks like it is known in the prior art. The take folder may be a region of the currently selected track (e.g. a single audio track or single movie track) which includes audio.

Figure 1:
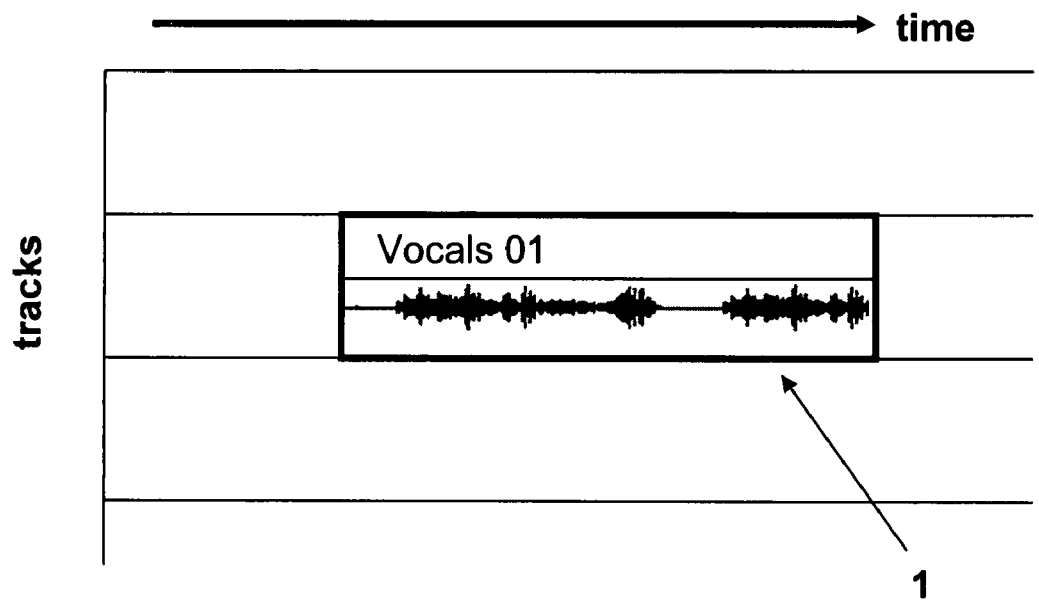
FIG. 1 shows a first take of a loop recording.

The first take may appear as a usual audio region. This is illustrated in FIG. 1 which shows a part of an arrange window where each row represents one track over time. The first take is here represented by a vocals 01 box 1 in which an audio signal is recorded over a certain time.

Figure 2:
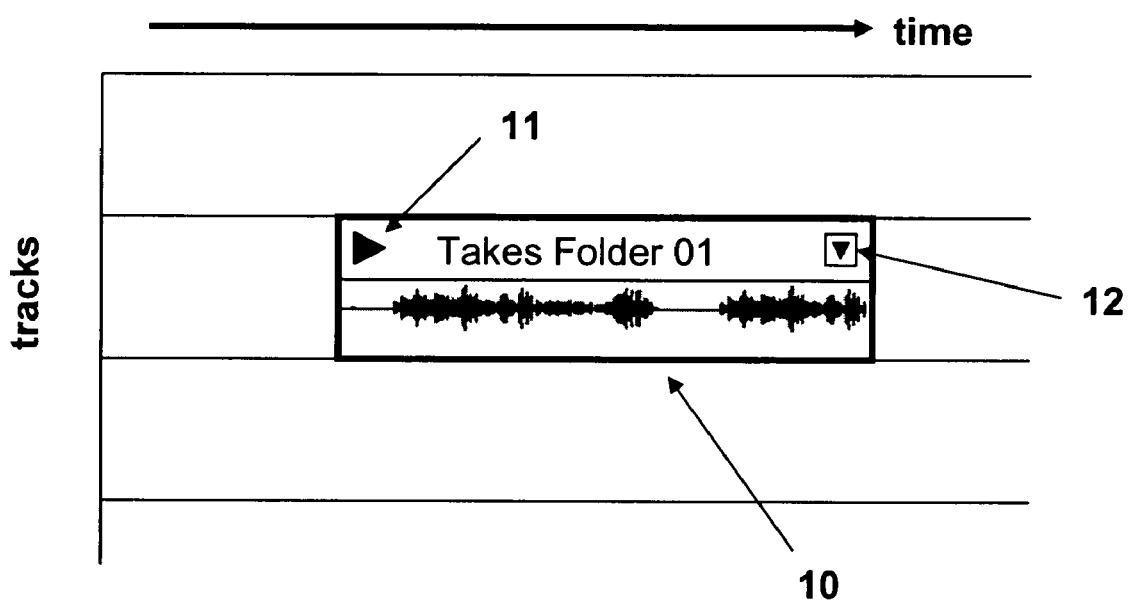
FIG. 2 shows a closed take folder.

As soon as a recording takes place over an existing region, which is the second cycle of a loop recording in this case, a take folder is created as shown in FIG. 2. The takes folder 10 in FIG. 2 occupies by default only one row which represents one audio track. In order to see the content of the take folder 10, which is the recordings which took place in its space, one could e.g. press the open/close triangle 11 on its upper left corner. However, there are several other ways to open the take folder 10, like double-clicking on the take folder or using a predetermined key command. Alternatively, it is also possible that the take folder 10 is by default open showing all recorded takes belonging to that folder.

Figure 3:
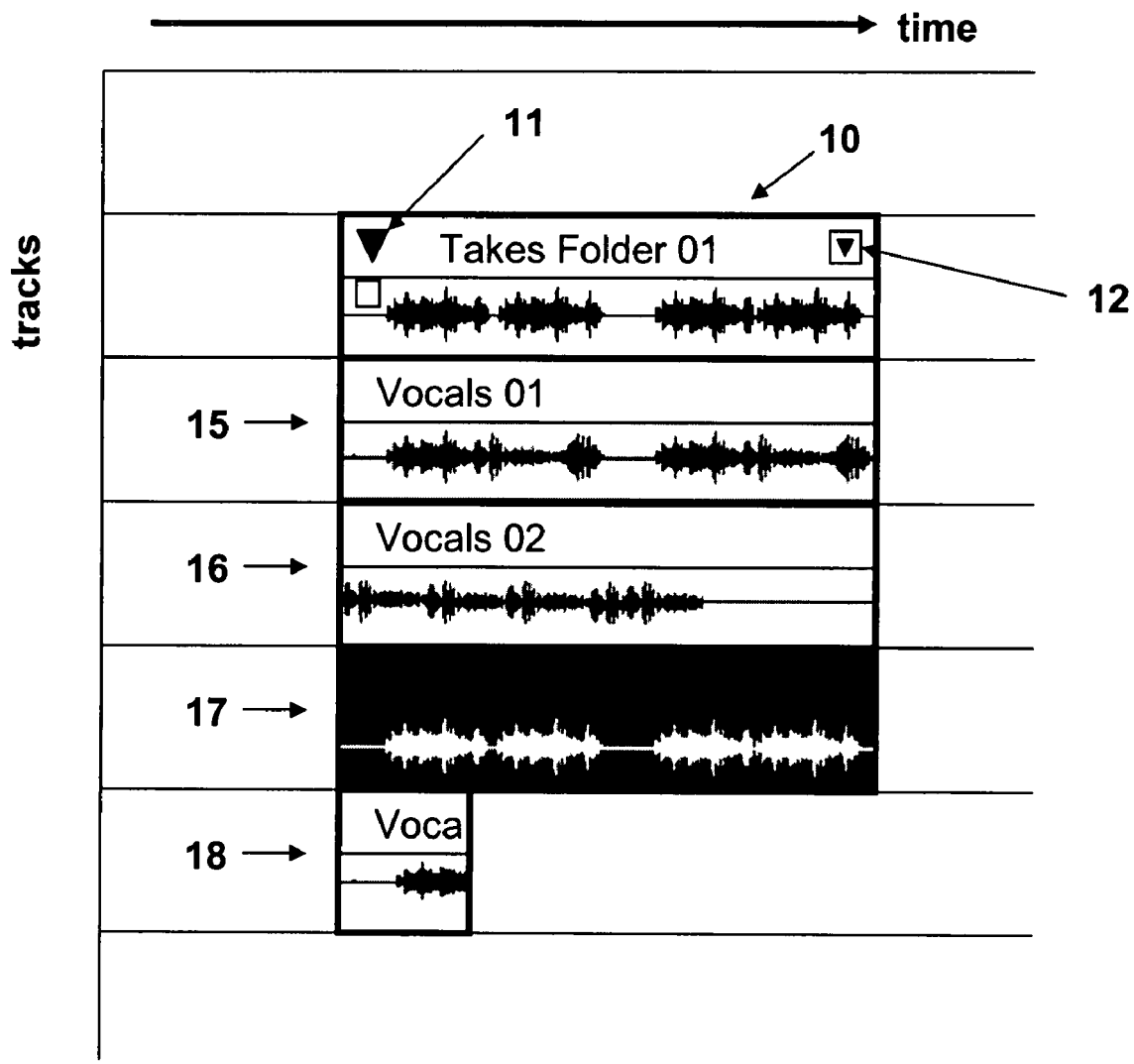
FIG. 3 shows an open take folder.

FIG. 3 shows an example for the opened take folder 10 of FIG. 2. The open/close triangle 11 now points down and the take folder content appears on new temporary rows. It should be noted that the different vocals are not recorded or saved in different tracks of the window; only for display purposes, several rows are used. Nevertheless, all takes of the take folder 10 belong to a single track such as a single audio track. The take folder 10 usually occupies the original row whereas the content of the folder is displayed below. The first take 15 appears as the first additional line under the first line of the take folder 10; the second take 16, the third take 17 and the fourth take 18 appear consecutively below. Waveform data for each of the takes is displayed in the box of the respective take; in other embodiments, other types of data may be displayed in the box of the respective take.

In FIG. 3 the third take 17 is selected. Other takes can be selected either by selecting another take, e.g. by clicking on it, or by using a menu 12 in the top right corner of the take folder 10. It is possible to set a default selection criterion, like using the last or first nearly complete take. If e.g. the last take is chosen by default and that take is not complete, it is possible to automatically fill the missing parts by using contents from the second to last take. However, multiple other settings can be employed.

Figure 4:
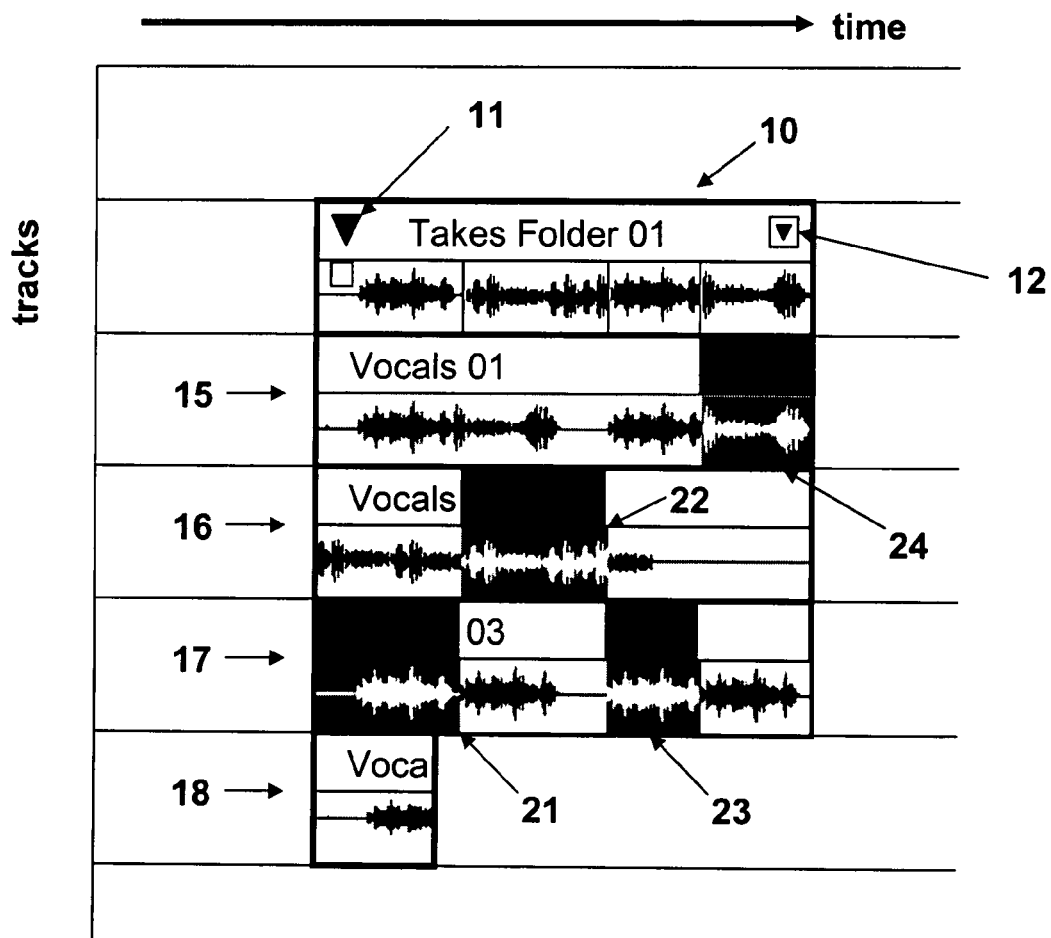
FIG. 4 shows a compilation within an open take folder.

At least certain embodiments of the present invention also support the compilation of a final result out of sections of different takes—a process referred to as "comping" or "creating a comp". "Comp" is used as an abbreviation for compilation in this context. Sections of different takes can be compiled by selecting sections in the different take lines. That means in the example of FIG. 3, selecting different sections in the first take 15, the second take 16, the third take 17 and/or the fourth take 18. Such a possible selection is shown in FIG. 4. These selections may be made through click and drag user interface manipulations or other techniques known in the art for selecting a region of time based content.

FIG. 4 illustrates an example of a possible compilation. Sections 21 to 24 have been selected out of the first to third takes 15 to 17. Such a selection can be made using a pointer controlled by a mouse or by any other known device. Those selected sections are marked with a black background. The take folder 10 displays in the top line the waveform overview data of all selected sections. In this example, vertical lines mark the transitions between different takes. Selections do not overlap in time and there are no breaks between adjacent selections in this example.

Selecting a section in one take deselects the same section in all other takes. In a take folder, only one take can play at any given point in time. Editing the current comp is also possible by changing the borders of existing selections. If a selection of one take is extended (move the beginning to the left or move the end to the right), adjacent selections in different takes will simultaneously be shortened to guarantee that there is no overlap.

There are numerous ways to select/deselect sections for a compilation. Some possibilities will be described for illustrative purposes only. They are not to be understood as restrictive or limiting. For reducing the size of a selection there are at least the following options. First, it is possible to move an edge of a selection without using any modifier. This will simultaneously change adjacent selections in other takes accordingly, i.e. extend those selections. This ensures that no silence is created between different sections. Second, it is possible to move an edge of a selection for reducing the selection together with the use of a first modifier (e.g. a shift-key). This will not extend the selection of the adjacent selection which will create a break. Thus, there will be silence in the final compilation.

Next, it is possible to move a selection, e.g. by clicking and holding the selection in its center. This will move the target selection as desired. Accordingly, both edges of the selection will move at the same time. Adjacent selections in other takes follow the movement (they may even be removed entirely when moving far enough). Non-adjacent selections in other takes do not follow the movement (but they may become adjacent during the movement). Furthermore, it is also possible to remove complete selections or even complete takes. Depending on modifier options or settings, either one or more breaks are created or the missing sections are filled by automatically extending the adjacent selections. If a complete take is deleted, e.g. by use of the menu 12, all takes which where formerly below that take will move one line up. The menu 12 can, among others, also be used to give the take folder 10 or a take within the take folder 10 a certain name.

When the selection of the desired sections within a take folder 10 is completed, a compilation can either be created by closing the take folder 10 using the open/close triangle 11 or by selection of this option in the menu 12. When such a compilation is created, it is advantageous to automatically rename the take folder 10 and change its name to e.g. "comp XY". Thus, it is clear that a compilation has been created out of different takes.

Figure 5:
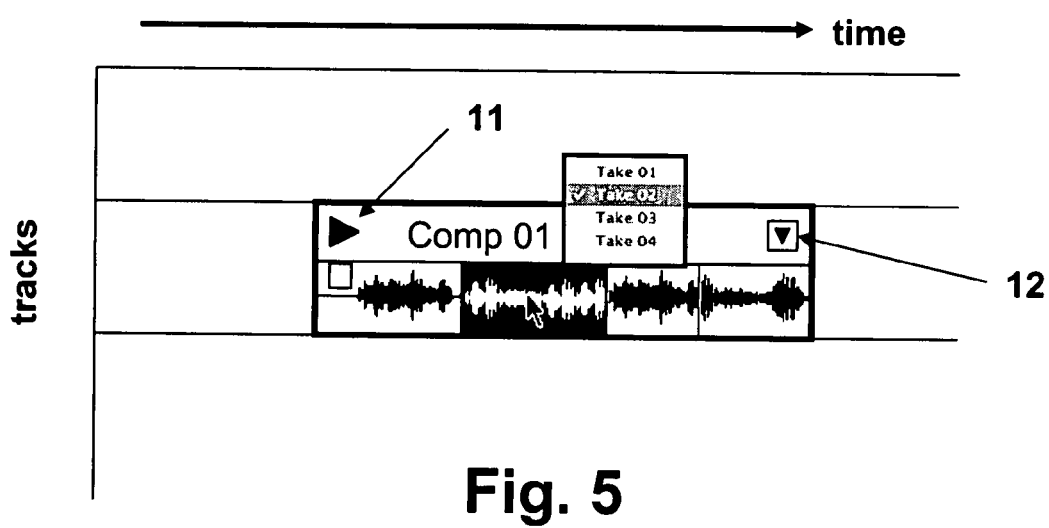
FIG. 5 shows a closed take folder with a compilation.

FIG. 5 shows a compilation which results when closing the take folder 10 of FIG. 4. Such a comp is a renamed take folder wherein sections of takes have been selected. Compilations can still be edited within a compilation shown in FIG. 5. By marking a section, a window can be opened which indicates which take has been selected for that section. This window can also be used to select another take for that section. Alternatively, the open/close triangle 11 can be used to open the folder again. Furthermore, it is also possible to add additional takes to a take folder or a compilation later on, e.g. by assigning other audio sections to that folder or by adding new recordings. When a compilation is finished and does not need to be changed anymore, there is the possibility to save just the selected sections and to discard all other sections of the takes in order to save memory space.

The present invention as described above can be implemented in numerous ways, e.g. by hardware only, by a program stored on a storage medium, etc. Such a program which enables a data processing system, such as a computer system, to execute one or more of the above described features of the invention may comprise a processor coupled to a display device and to a data storage device such as a hard drive or other magnetic media and/or an optical media (e.g. CD-ROM) or a semiconductor memory such as DRAM or flash memory. The system may also include a mouse and keyboard both connected electrically to the processor. Other variations of the data processing system can be envisaged. For example, the use of a joystick or roller ball or stylus pen and/or a plurality of temporary and hard disc drives and/or connection of the system to the Internet and/or other applications of the system in a specific application which may not include a keyboard or mouse, but rather input buttons and menus on the screen.

The processes of the methods described herein may be carried out in automated fashion in data processing equipment, preferably with a display device such as a CRT or LCD or plasma displays or via projectors onto a screen.

A result of at least certain embodiments of the invention may be a data file, created through one of the methods described herein, which may be stored on a storage device of a data processing system. The data file may be an audio data file, in a digital format, which may be used to create sound by playing the data file on a system which is coupled to audio transducers, such as speakers.

One or more of the methods described herein may be implemented on a data processing system which is operable to execute those methods. The data processing system may be a general purpose or special purpose computing device, or a desktop computer, a laptop computer, a personal digital assistant, a mobile phone, an entertainment system, a music synthesizer, a multimedia device, an embedded device in a consumer electronic product, or other consumer electronic devices. In a typical embodiment, a data processing system includes one or more processors which are coupled to memory and to one or more buses. The processor(s) may also be coupled to one or more input and/or output devices through the one or more buses. Examples of data processing systems are shown and described in U.S. Pat. No. 6,222,549, which is hereby incorporated herein by reference.

The one or more methods described herein may also be implemented as a program storage medium which stores and contains executable program instructions for, when those instructions are executed on a data processing system, causing the data processing system to perform one of the methods. The program storage medium may be a hard disk drive or other magnetic storage media or a CD or other optical storage media or DRAM or flash memory or other semiconductor storage media or other storage devices.

The foregoing description has been given by way of example only and it will be appreciated by a person skilled in the art that numerous modifications can be made without departing from the scope of the present invention.

The invention claimed is:

1. A method for recording and compiling same audio content, the method comprising:
   recording multiple takes of the same audio content;
   storing multiple takes of the same audio content;
   storing a data structure representing a take folder to store the multiple takes of the same audio content;
   compiling a final music section in one track from the data structure; and
   automatically ensuring that there are no breaks in the final music section by extending one or more adjacent sections in one or more other takes when a section is deselected in one take.

2. The method as in claim 1 wherein the take folder is associated with a single track.

3. The method as in claim 1 wherein different takes are displayed separately when the take folder is opened.

4. The method as in claim 1 wherein sections of one or more takes can be selected to be part of a resulting compilation which is composed of the selected sections.

5. The method as in claim 4 wherein selected sections are highlighted in the different takes when the take folder is opened.

6. The method as in claim 1 wherein a first area of the take folder displays the selected compilation.

7. The method as in claim 6 wherein transitions from one take to another take are marked within the first display area of the take folder.

8. The method as in claim 4 wherein the method automatically ensures that selected sections do not overlap in time.

9. The method as in claim 8 wherein selecting a section in one take deselects the same section in all other takes.

10. A program for recording same audio content which instructs a computer system to execute a method for recording the same audio content as claimed in claim 1.

11. A storage medium, having stored therein a program for recording the same audio content as claimed in claim 10.

12. A computer system being adapted to execute a program for recording the same audio content as claimed in claim 10.

13. A storage medium containing the same audio content produced in accordance with the method of claim 1.

14. A machine implemented method for processing same audio content, the method comprising:
   recording multiple instances of the same audio content;
   storing the multiple instances in a folder in a storage device;
   compiling a final music section in one track from the folder; and
   automatically ensuring that there are no breaks in the final music section by extending one or more adjacent sections in one or more other takes when a section is deselected in one take.

15. The method as in claim 14 wherein the recording occurs serially over time and the storing occurs serially over time in response to the recording and wherein the storing of the multiple instances in the folder is performed automatically in response to the recording and wherein the folder is represented in a data structure of a data processing system.

16. The method as in claim 15 wherein the data structure comprises a tree of a file system which represents subdirectories which include the folder.

17. The method as in claim 15 wherein the storing occurs repeatedly after an initial take without a user's specifying of the folder as a storage location.

18. The method as in claim 17 wherein each instance of the multiple instances is a take which is associated with a single audio track and wherein different takes are displayed separately when the folder is opened.

19. The method as in claim 18 wherein sections of one or more takes can be selected to be part of a resulting compilation which is composed of the selected sections.

20. The method as in claim 19, the method further comprising:
   adjusting automatically at least one selected take to ensure that selected sections do not overlap in time.

21. The method as in claim 20, wherein selected sections are highlighted in the different takes when the folder is opened.

22. The method as in claim 19 wherein selecting a section in one take deselects the same section in all other takes.

23. The method as in claim 19 wherein the same audio content is a same portion of music specified by a musical score.

24. A machine readable medium containing executable program instructions which when executed by a data processing system cause the data processing system to perform a method for processing same audio content, the method comprising:
   recording multiple instances of the same audio content;
   storing the multiple instances in a folder in a storage device;
   compiling a final music section in one track from the folder; and
   automatically ensuring that there are no breaks in the final music section by extending one or more adjacent sections in one or more other takes when a section is deselected in one take.

25. The medium as in claim 24 wherein the recording occurs serially over time and the storing occurs serially over time in response to the recording and wherein the storing of the multiple instances in the folder is performed automatically in response to the recording and wherein the folder is represented in a data structure of a data processing system.

26. The medium as in claim 25 wherein the data structure comprises a tree of a file system which represents subdirectories which include the folder.

27. The medium as in claim 25 wherein the storing occurs repeatedly after an initial take without a user's specifying of the folder as a storage location.

28. The medium as in claim 27 wherein each instance of the multiple instances is a take which is associated with a single audio track and wherein different takes are displayed separately when the folder is opened.

29. The medium as in claim 28 wherein sections of one or more takes can be selected to be part of a resulting compilation which is composed of the selected sections.

30. The medium as in claim 29, the method further comprising:
   adjusting automatically at least one selected take to ensure that selected sections do not overlap in time.

31. The medium as in claim 30, wherein selected sections are highlighted in the different takes when the folder is opened.

32. The medium as in claim 29, wherein selecting a section in one take deselects the same section in all other takes.

33. The medium as in claim 29 wherein the same audio content is a same portion of music specified by a musical score.

34. A data processing system for processing same audio content comprising:
   means for recording multiple instances of the same audio content;
   means for storing the multiple instances of the same audio content in a folder in a storage device electronically coupled to the means for recording multiple instances;
   means for compiling a final music section in one track from the folder; and
   means for automatically ensuring that there are no breaks in the final music section by extending one or more adjacent sections in one or more other takes when a section is deselected in one take.

35. The data processing system as in claim 34 wherein the recording occurs serially over time and the storing occurs serially over time in response to the recording and wherein the storing of the multiple instances in the folder is performed automatically in response to the recording and wherein the folder is represented in a data structure of a data processing system.

36. The data processing system as in claim 35 wherein the storing occurs repeatedly after an initial take without a user's specifying of the folder as a storage location.

37. The data processing system as in claim 36 wherein each instance of the multiple instances is a take which is associated with a single audio track and wherein different takes are displayed separately when the folder is opened.

38. The data processing system as in claim 37 wherein sections of one or more takes can be selected to be part of a resulting compilation which is composed of the selected sections.

39. A data processing system comprising:
   an input device for receiving same audio content;
   a storage device;
   a processing system electronically coupled to the input device and to the storage device, the input device receiving multiple instances of the same audio content and the processing system causing the storage of the multiple instances in a take folder on the storage device and the processing system compiling a final music section in one track from the folder and automatically ensuring that there are no breaks in the final music section by extending one or more adjacent sections in one or more other takes when a section is deselected in one take.

40. A data processing system as in claim 39 further comprising:
   an audio output device electronically coupled to the storage device to play back selected instances of a resulting compilation.

* * * * *